(12) United States Patent
Xu et al.

(10) Patent No.: US 12,443,299 B2
(45) Date of Patent: Oct. 14, 2025

(54) DISPLAY PANEL AND ELECTRONIC DEVICE

(71) Applicant: TCL CHINA STAR OPTOELECTRONICS TECHNOLOGY CO., LTD., Guangdong (CN)

(72) Inventors: Liangying Xu, Guangdong (CN); Feng Zheng, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/523,502

(22) Filed: Nov. 29, 2023

(65) Prior Publication Data

US 2025/0117095 A1 Apr. 10, 2025

(30) Foreign Application Priority Data

Oct. 7, 2023 (CN) .......................... 202311288131.X

(51) Int. Cl.
*G06F 3/041* (2006.01)
*G06F 3/044* (2006.01)
(Continued)

(52) U.S. Cl.
CPC .......... *G06F 3/0412* (2013.01); *G06F 3/0445* (2019.05); *G06F 3/0446* (2019.05); *H01L 25/0753* (2013.01); *H10H 20/857* (2025.01); *G06F 2203/04107* (2013.01); *G06F 2203/04111* (2013.01)

(58) Field of Classification Search
CPC ................. G06F 3/0412; G06F 3/0446; G06F 2203/04107; G06F 2203/04111; H10H 20/857; H01L 25/0753
See application file for complete search history.

(56) References Cited

U.S. PATENT DOCUMENTS

2015/0331508 A1 11/2015 Nho et al.
2017/0344787 A1* 11/2017 Cho .................... G06F 3/04166
(Continued)

FOREIGN PATENT DOCUMENTS

CN 114815342 A 7/2022
CN 115457877 A 12/2022
(Continued)

OTHER PUBLICATIONS

Japanese Office Action issued in corresponding Japanese Patent Application No. 2023-208818, dated Aug. 27, 2024, with English translation.

*Primary Examiner* — Lixi C Simpson
(74) *Attorney, Agent, or Firm* — HSML P.C.

(57) ABSTRACT

A display panel and an electronic device. The display panel includes at least one first display substrate. The first display substrate includes a drive device layer, a first insulating layer, a first touch control layer, a light-emitting device binding layer, and a light-emitting device. The first touch control layer is provided with a number of first touch control electrodes. The first touch control electrode is electrically connected to a first touch control drive device through a first via hole penetrating the first insulating layer.

18 Claims, 5 Drawing Sheets

(51) Int. Cl.
*H01L 25/075* (2006.01)
*H01L 33/62* (2010.01)
*H10H 20/857* (2025.01)

(56) References Cited

U.S. PATENT DOCUMENTS

| | | | |
|---|---|---|---|
| 2019/0138131 A1 | 5/2019 | Kim et al. | |
| 2020/0133437 A1* | 4/2020 | Kuo | G06F 3/04164 |
| 2020/0233516 A1 | 7/2020 | Hwang et al. | |
| 2021/0117045 A1 | 4/2021 | Mu | |
| 2022/0069001 A1* | 3/2022 | Kang | H10H 20/825 |
| 2023/0317903 A1* | 10/2023 | Kwon | H10H 20/857 |
| | | | 257/79 |
| 2024/0099168 A1* | 3/2024 | Navarro | H10N 70/826 |

FOREIGN PATENT DOCUMENTS

| | | |
|---|---|---|
| JP | 2015143843 A | 8/2015 |
| JP | 2016201539 A | 12/2016 |
| JP | 2017168095 A | 9/2017 |
| JP | 2023090631 A | 6/2023 |
| WO | 2016189426 A1 | 12/2016 |

* cited by examiner

DISPLAY PANEL AND ELECTRONIC DEVICE

CROSS-REFERENCE TO RELATED APPLICATION

This application claims priority to and the benefit of Chinese Patent Application No. 202311288131.X, filed on Oct. 7, 2023, the disclosure of which is incorporated herein by reference in its entirety.

TECHNICAL FIELD

The present disclosure relates to the field of display technologies, and more particularly, to a display panel and an electronic device.

BACKGROUND

With the development of display technology, large-screen display is widely used, such as large-screen displays, which can be applied to scenes such as shopping malls, conference rooms, classrooms, and the like. Currently, most of the touch control schemes for large-screen display on the market are infrared touch control, and the cost of the infrared touch control is low. However, due to the characteristics of the infrared transmitting tube and the receiving tube of the infrared touch control, the border surface of the large-screen display using the infrared touch control protrudes 13.6 mm, so that the appearance of the large-screen display is poor, and the full-plane display cannot be realized. In order to match the high-end market of education and realize full-screen display, the related art has developed a scheme using external-mounted capacitive touch control. However, the external-mounted capacitive touch control scheme has a border, which is unfavorable for realizing full-screen display.

SUMMARY

The present disclosure provides a display panel and an electronic device.

In an aspect of the present disclosure, provided is a display panel including at least one first display substrate. The first display substrate includes a first insulating layer; a drive device layer disposed on a side of the first insulating layer, the drive device layer including a first touch control drive device and a first light-emitting drive device; a first touch control layer disposed on a side of the first insulating layer away from the drive device layer, the first touch control layer being provided with a number of first touch control electrodes electrically connected to a first touch control drive device; a light-emitting device binding layer disposed on a side of the first touch control layer away from the drive device layer, the light-emitting device binding layer being provided with a number of binding electrodes electrically connected to the first light-emitting drive device; and a light-emitting device disposed on a side of the light-emitting device binding layer away from the first touch control layer and bonded to the binding electrode. The first display substrate further includes a plurality of first via holes, each of the first via holes penetrating the first insulating layer. The first touch control electrode includes an electrode portion and a connection portion, the electrode portion being located on the side of the first insulating layer away from the drive device layer, and the connection portion being located in the first via hole. The electrode portion is electrically connected to the first touch control drive device through the connection portion.

In an aspect of the present disclosure, provided is an electronic device including a display panel. The display panel includes at least one first display substrate. The first display substrate includes a first insulating layer; a drive device layer disposed on a side of the first insulating layer, the drive device layer including a first touch control drive device and a first light-emitting drive device; a first touch control layer disposed on a side of the first insulating layer away from the drive device layer, the first touch control layer being provided with a number of first touch control electrodes electrically connected to a first touch control drive device; a light-emitting device binding layer disposed on a side of the first touch control layer away from the drive device layer, the light-emitting device binding layer being provided with a number of binding electrodes electrically connected to the first light-emitting drive device; and a light-emitting device disposed on a side of the light-emitting device binding layer away from the first touch control layer and bonded to the binding electrode. The first display substrate further includes a plurality of first via holes, each of the first via holes penetrating the first insulating layer. The first touch control electrode includes an electrode portion and a connection portion, the electrode portion being located on the side of the first insulating layer away from the drive device layer, and the connection portion being located in the first via hole. The electrode portion is electrically connected to the first touch control drive device through the connection portion.

BRIEF DESCRIPTION OF THE DRAWINGS

In order that the embodiments or the technical solutions in the related art may be described more clearly, reference will now be made to the accompanying drawings which are to be used in the description of the embodiments or the related art. It will be apparent that the accompanying drawings in the description are merely exemplary of the present disclosure, and that other drawings may be obtained by those skilled in the art without involving any inventive effort.

DETAILED DESCRIPTION

Figure 1:
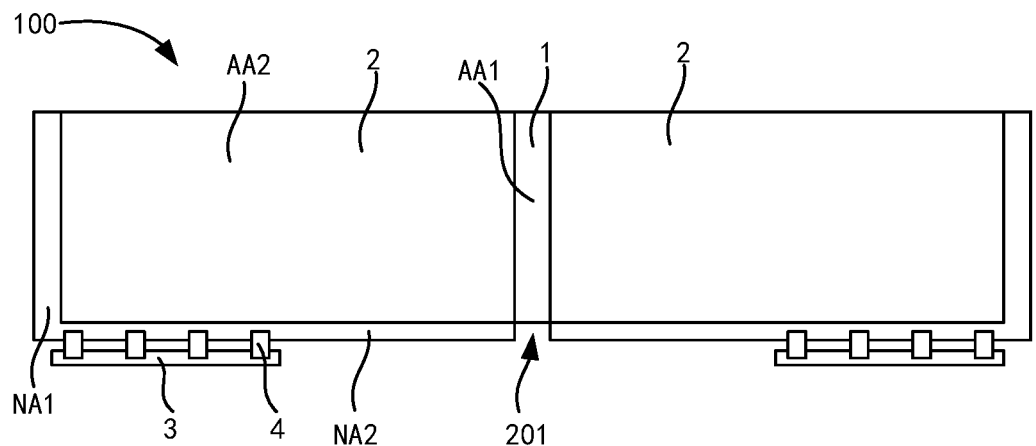
FIG. 1 is a schematic top view of a structure of a display panel according to an embodiment of the present disclosure.

The following description of the embodiments is made with reference to the accompanying drawings to illustrate specific embodiments in which the present disclosure may be implemented. The direction terms mentioned in the present disclosure, such as [upper], [lower], [front], [rear], [left], [right], [inner], [outer], [side], and the like, are only directions with reference to the accompanying drawings. Thus, directional language is used to illustrate and understand the present disclosure, and not to limit the present disclosure. In the figures, structurally similar elements are denoted by the same reference numerals. In the drawings, the thickness of some layers and regions is exaggerated for clarity of understanding and ease of description. That is, the dimensions and thickness of each component shown in the drawings are arbitrarily shown, but the present disclosure is not limited thereto.

Figure 2:
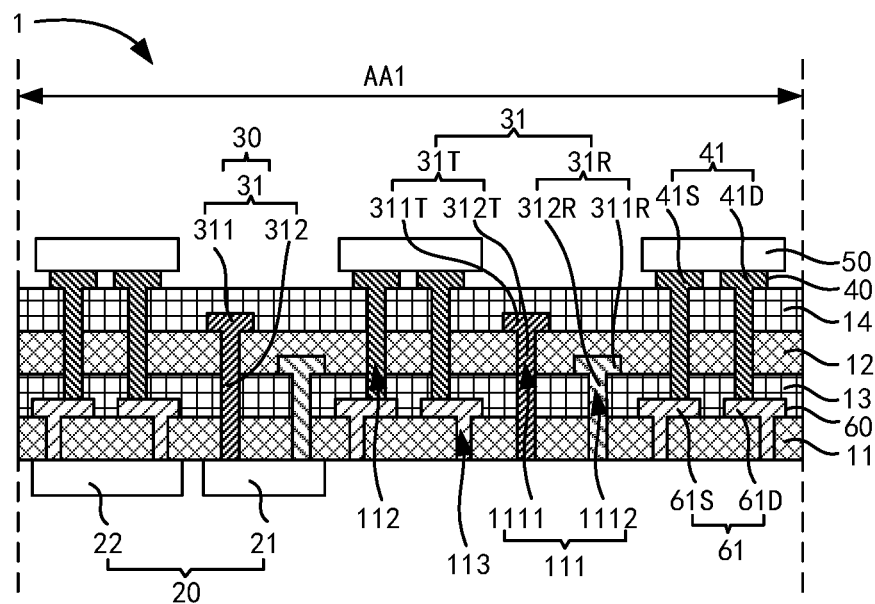
FIG. 2 is a schematic cross-sectional view of a structure of the first display substrate of FIG. 1.
Figure 3:
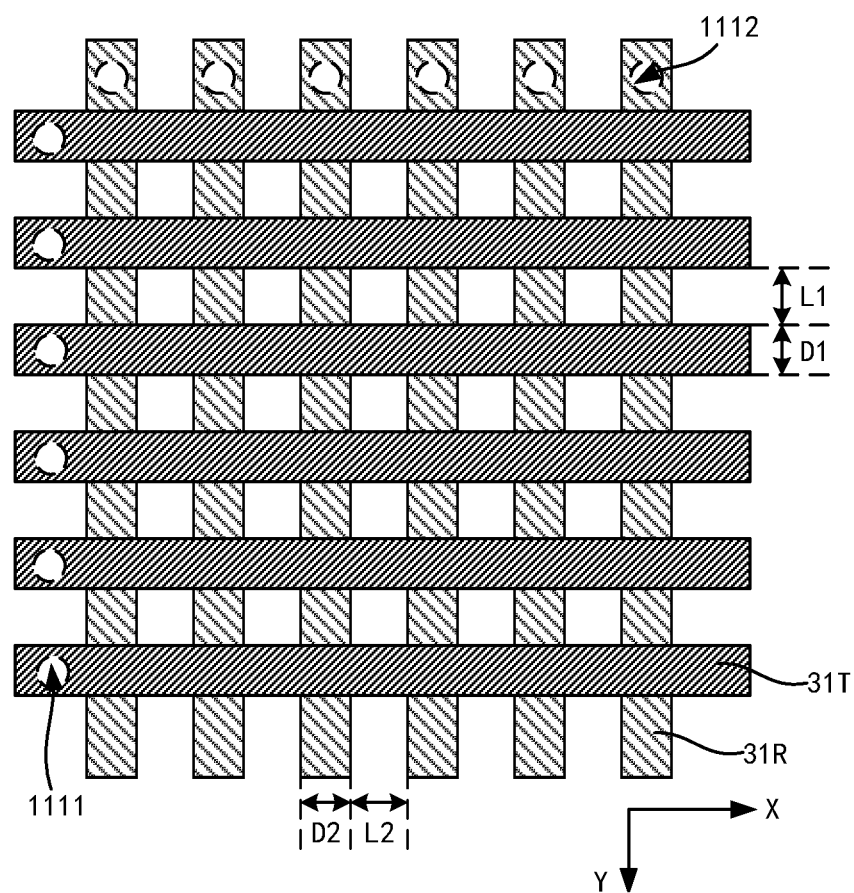
FIG. 3 is a schematic top view of a structure of the first touch control layer of FIG. 2.
Figure 4:
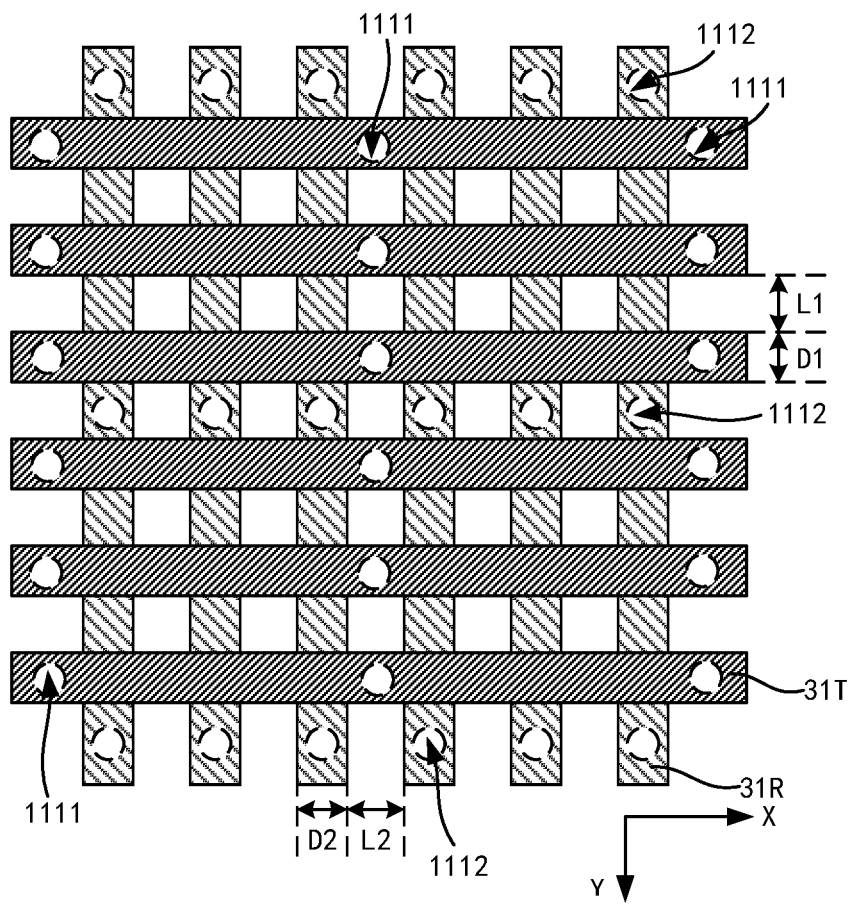
FIG. 4 is a schematic top view of another structure of the first touch control layer of FIG. 2.
Figure 5:
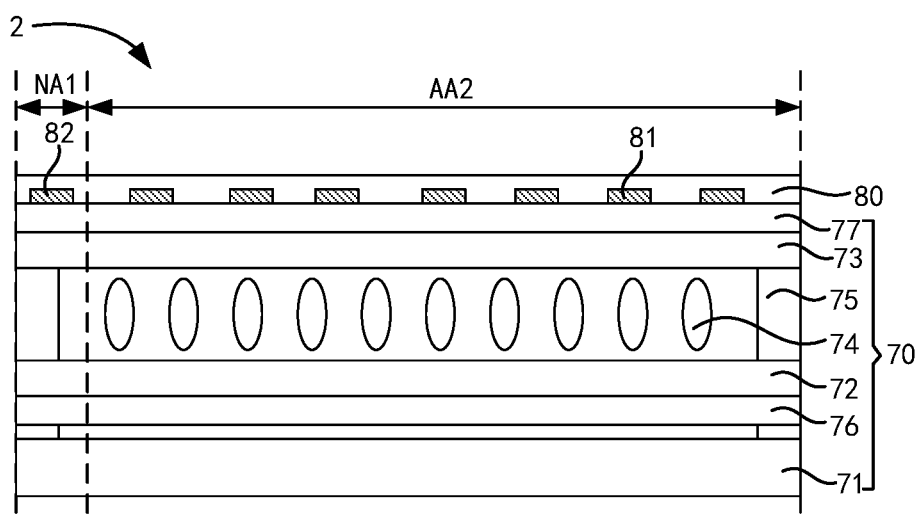
FIG. 5 is a schematic cross-sectional view of a structure of the second display substrate of FIG. 1.
Figure 6:
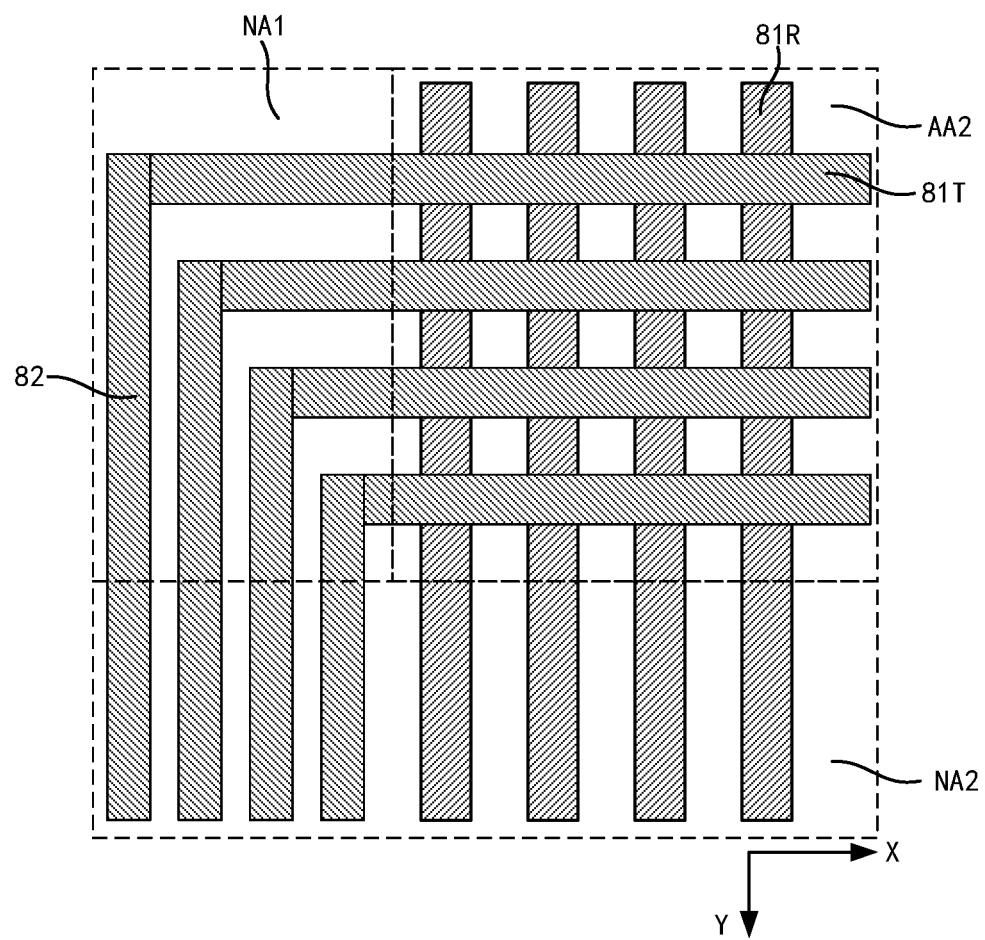
FIG. 6 is a schematic top view of a structure of the second touch control layer of FIG. 5.

Referring to FIGS. 1 to 6. FIG. 1 is a schematic top view of a structure of a display panel according to an embodiment of the present disclosure. FIG. 2 is a schematic cross-sectional view of a structure of the first display substrate of FIG. 1. FIG. 3 is a schematic top view of a structure of the first touch control layer of FIG. 2. FIG. 4 is a schematic top view of another structure of the first touch control layer of FIG. 2. FIG. 5 is a schematic cross-sectional view of a structure of the second display substrate of FIG. 1. FIG. 6 is a schematic top view of a structure of the second touch control layer of FIG. 5. Referring to FIG. 1, the display panel 100 is a spliced display panel 100 to achieve a large-sized large-screen display. The display panel 100 includes at least one first display substrate 1 and a plurality of second display substrates 2. The plurality of second display substrates 2 are spliced to each other. The first display substrate 1 is located at a splice between two adjacent second display substrates 2, and a splice seam is formed at the splice. The splice seam can be eliminated by arranging the first display substrate 1 in the splice seam.

It should be noted that although the first display substrate 1 is provided in the splice seam such that the splice seam can be eliminated; however, when the first display substrate 1 adopts an infrared touch control or an external-mounted capacitive touch control, the first display substrate 1 inevitably has a touch control border. An area where the touch control border is located cannot be used for display, so that the position of the splicing seam still has a region that cannot be displayed, and the splice seam cannot be completely eliminated. To this end, the present disclosure provides a display panel 100 for solving the problem that there exists a touch control border by improving a touch scheme of the first display substrate 1.

With continued reference to FIG. 1, an embodiment of the present disclosure is described in which the display panel 100 includes one first display substrate 1 and two second display substrates 2, but the present disclosure is not limited thereto. The display panel 100 of the present disclosure may further include more first display substrates 1 and more second display substrates 2. Of course, in some embodiments, the display panel 100 of the present disclosure may also include only one of the first display substrates 1.

The display panel 100 includes a first display area AA1, a second display area AA2, and a first non-display area NA1 and a second non-display area NA2 located on one side of the second display area AA2. The first display area AA1 is located between two adjacent second display areas AA2, and the first non-display area NA1 is located on one side of the second display area AA2 away from the first display area AA1. The first display substrate 1 is provided corresponding to the first display area AA1. The second display substrate 2 is provided corresponding to the second display area AA2, the first non-display area NA1, and the second non-display area NA2. In other words, the first display substrate 1 includes the first display area AA1, and the second display substrate 2 includes the second display area AA2, the first non-display area NA1, and the second non-display area NA2.

The first display area AA1 and the second display area AA2 are both configured for displaying pictures. The first non-display area NA1 and the second non-display area NA2 are both configured for setting various traces or the like. The second non-display area NA2 is further configured to be connected to an external drive circuits. For example, the display panel 100 further includes a chip-on-film (COF) and a print circuit board (PCB). The second non-display area NA2 is provided with a binding circuit. The binding circuit is electrically connected to the print circuit board 4 through the chip-on-film 3, so that the second display substrate 2 is electrically connected to the external circuits.

The structures of the first display substrate 1 and the second display substrate 2 will be explained in detail below.

Referring to FIG. 2, the first display substrate 1 includes a first insulating layer 11, a drive device layer 20, a first touch control layer 30, a light-emitting device binding layer 40, and a light-emitting device 50. The drive device layer 20 is located on one side of the first insulating layer 11. The drive device layer 20 includes a first touch control drive device 21 and a first light-emitting drive device 22. The first touch control drive device 21 includes a touch control integrated circuit (IC), and the first light-emitting drive device 22 includes a light-emitting drive integrated circuit (IC).

The first touch control layer 30 is disposed on one side of the first insulating layer 11 away from the drive device layer 20. The first touch control layer 30 is disposed with first touch control electrodes 31. The first touch control electrode 31 is in electrically connected to the first touch control drive device 21. Specifically, the first display substrate 1 further includes a plurality of first via holes 111. Each of the first via holes 111 penetrates the first insulating layer 11. The first touch control electrode 31 includes an electrode portion 311 and a connection portion 312. The electrode portion 311 is located on one side of the first insulating layer 11 away from the drive device layer 20. The connection portion 312 is located in the first via hole 111. The electrode portion 311 is electrically connected to the first touch control drive device 21 through the connection portion 312.

The light-emitting device binding layer 40 is provided on one side of the first touch control layer 30 away from the drive device layer 20. The light-emitting device binding layer 40 is provided with binding electrodes 41 electrically connected to the first light-emitting drive device 22. The light-emitting device 50 is disposed on one side of the light-emitting device binding layer 40 away from the first touch control layer 30, and is bonded to the binding electrode 41. The first light-emitting drive device 22 is configured to drive the light-emitting device 50 to emit light. The light-emitting device 50 includes at least one of a light-emitting diode (LED) device, a micro light-emitting diode (Micro-LED) device, or a sub-millimeter (i.e., mini) light-emitting diode (Mini-LED) device. Alternatively, the first display substrate 1 may be formed by binding the light-emitting device 50 to the print circuit board 4. That is, the first display substrate 1 is an LED light-emitting substrate using a PCB base.

As such, the first touch control layer 30 is integrated in the first display substrate 1, and the first touch control electrode 31 of the first touch control layer 30 is directly electrically connected to the first touch control drive device 21 by perforating the first display substrate 1, so that the first touch control layer 30 does not have a touch control border, thereby solving a problem that a touch control border exists when an external-mounted capacitive touch control solution is adopted for a conventional large-screen display. Meanwhile, since the first display substrate 1 does not have a touch control border, when the first display substrate 1 is provided at the splice seam of adjacent second display substrates 2, the entire position in which the splice seam locates can be used for display, so that the splice seam can be completely eliminated, thereby realizing the display panel 100 with zero splice seam.

The electrical connection of the first touch control electrode 31 to the first touch control drive device 21 and the electrical connection of the light-emitting device 50 to the first light-emitting drive device 22 are then explained in detail.

With continued reference to FIG. 2, the first touch control electrode 31 includes a first drive electrode 31T and a first sense electrode 31R. The first drive electrode 31T includes a drive electrode portion 311T and a drive connection portion 312T. The first sense electrode 31R includes a sense electrode portion 311R and a sense connection portion 312R. The drive electrode portion 311T and the sense electrode portion 311R are located at different layers. For example, the first display substrate 1 further includes a second insulating layer 12 located on one side of the first insulating layer 11 away from the drive device layer 20. The drive electrode portion 311T is located on one side of the second insulating layer 12 away from the first insulating layer 11. The sense electrode portion 311R located on one side of the second insulating layer 12 adjacent to the first insulating layer 11.

The first via hole 111 includes a first sub-hole 1111 penetrating the second insulating layer 12 and the first insulating layer 11, and a second sub-hole 1112 penetrating the first insulating layer 11. The drive connection portion 312T is located in the first sub-hole 1111. The drive electrode portion 311T is electrically connected to the first touch control drive device 21 through the drive connection portion 312T. The sense connection portion 312R is located in the second sub-hole 1112. The sense electrode portion 311R is electrically connected to the first touch control drive device 21 through the sense connection portion 312R.

Further, the first display substrate 1 further includes a signal line layer 60, a third insulating layer 13, and a fourth insulating layer 14. The signal line layer 60 is disposed on one side of the first insulating layer 11 adjacent to the first touch control layer 30. The signal line layer 60 includes signal traces 61 electrically connected between the first light-emitting drive device 22 and the binding electrode 41. The third insulating layer 13 is provided between the signal line layer 60 and the first touch control layer 30 for isolating the signal line layer 60 and the first touch control layer 30. The fourth insulating layer 14 is disposed between the first touch control layer 30 and the light-emitting device binding layer 40 for isolating the first touch control layer 30 and the light-emitting device binding layer 40.

Alternatively, the materials of the first insulating layer 11, the second insulating layer 12, the third insulating layer 13, and the fourth insulating layer 14 are all the same, for example, all being resins. The materials of the signal line layer 60 and the first touch control electrode 31 of the first touch control layer 30 are the same, for example, both being copper.

The first display substrate 1 further includes a plurality of second via holes 112 penetrating the fourth insulating layer 14, the first touch control layer 30, and the third insulating layer 13, and a plurality of third via 113 penetrating the first insulating layer 11. The binding electrode 41 is electrically connected to the signal trace 61 through the second via hole 112. The signal trace 61 is electrically connected to the first light-emitting drive device 22 through the third via hole 113.

The signal trace 61 include a first signal trace 61S and a second signal trace 61D that are set to be insulated from each other. The binding electrode 41 includes a first binding electrode 41S and a second binding electrode 41D that are set to be insulated from each other. The first signal trace 61S is electrically connected to the first binding electrode 41S, and the second signal trace 61D is electrically connected to the second binding electrode 41D. The first signal trace 61S is configured to supply a positive electrode signal to the light-emitting device 50, and the second signal trace 61D is configured to supply a negative electrode signal to the light-emitting device 50.

It should be noted that when the second via hole 112 penetrates the first touch control layer 30, the first touch control electrode 31 of the first touch control layer 30 avoids the second via hole 112, preventing the second via hole 112 from passing through the first touch control electrode 31 and in turn affecting the touch control performance of the first touch control layer 30. For example, the first drive electrode 31T and the first sense electrode 31R of the first touch control layer 30 are intersected in an insulation manner to form a grid-like arrangement. The second via hole 112 can pass through the grid formed by the first drive electrode 31T and the first sense electrode 31R.

Specifically, the first drive electrodes 31T extend in a first direction X and are arranged at intervals in a second direction Y. The first sense electrodes 31R extend in the second direction Y and are arranged at intervals in the first direction X so that the first drive electrodes 31T and the first sense electrodes 31R are insulated and crossed to form a grid shape. The first direction X and the second direction Y are both parallel to the plane in which the first insulating layer 11 is located, and the first direction X and the second direction Y intersect at an included angle, for example, 90 degrees, in which case the first direction X and the second direction Y are perpendicular.

Alternatively, the line width D1 of the first drive electrode 31T is in the range of 30 μm to 100 μm, and the line width D2 of the first sense electrode 31R is also in the range of 30 μm to 100 μm. For example, both line widths may be 30 μm, 40 μm, 50 μm, 60 μm, 70 μm, 100 μm, etc. The line spacing L1 between adjacent first drive electrodes 31T is greater than or equal to 50 μm, and the line spacing L2 between adjacent first sense electrodes 31R is also greater than or equal to 50 μm. For example, both line spacing may be 50 μm, 60 μm, 70 μm, etc. Preferably, the line width D1 of the first drive electrode 31T is equal to the line width D2 of the first sense electrode 31R, the line spacing L1 between adjacent first drive electrodes 31T is equal to the line spacing L2 between adjacent first sense electrodes 31R, and the line width D1 of the first drive electrode 31T is equal to the line spacing L1 between adjacent first drive electrodes 31T. For example, the line widths may each be 50 μm, and the line spacing may each be 50 μm, so as to be compatible with the process technology when the first display substrate 1 adopts the PCB base.

With continued reference to FIG. 3, the first sub-hole 1111 may be provided corresponding to one end of the first drive electrode 31T, and the second sub-hole 1112 may be provided corresponding to one end of the first sense electrode 31R. However, the present disclosure is not limited thereto. The first sub-hole 1111 of the present disclosure may be located at both opposite ends of the first drive electrode 31T as well as at a middle region of the first drive electrode 31T. Similarly, the second sub-hole 1112 may be located at both opposite ends of the first sense electrode 31R as well as at a middle region of the first sense electrode 31R, so that each of the first drive electrodes 31T and each of the first sense electrodes 31R have a plurality of connection points thereon, as shown in FIG. 4. As such, by providing a plurality of connection points on each of the first drive electrodes 31T and each of the first sense electrodes 31R, the stability of the electrical connection between the first touch control electrode 31 and the first touch control drive device 21 can be improved, and the voltage drop of the first touch control electrode 31 can be reduced.

Referring to FIG. 5, the second display substrate 2 includes a light-emitting substrate 70 and a second touch control layer 80 on the light-emitting side of the light-emitting substrate 70. The second touch control layer 80 is provided with second touch control electrodes 81 and touch control traces 82 on one side of the second touch control electrodes 81 away from the first display substrate 1. Each of the touch control traces 82 is electrically connected to one of the second touch control electrodes 81.

Specifically, the light-emitting substrate 70 includes a backlight module 71 as well as a first substrate 72 and a second substrate 73 disposed in the light-emitting direction of the backlight module 71. Alternatively, the first substrate 72 is an array substrate, and the second substrate 73 is a color film substrate. However, the present disclosure is not limited thereto. The first substrate 72 of the present disclosure may also be an GOA (Gate Driver on Array) substrate, an COA (Color-filter on Array) substrate, or the like.

The light-emitting substrate 70 further includes a liquid crystal layer 74 disposed between the first substrate 72 and the second substrate 73, and a border sealant 75 surrounding the liquid crystal layer 74 to block water vapor, and to bond the first substrate 72 and the second substrate 73 together. Of course, the light-emitting substrate 70 further includes a first polarizer 76 located between the first substrate 72 and the backlight module 71, and a second polarizer 77 located between the second substrate 73 and the touch control layer.

The backlight module 71 is configured to provide backlight to the light-emitting substrate 70, and the backlight of the backlight module 71 is polarized by the first polarizer 76 and then is directed toward the liquid crystal layer 74. The liquid crystal molecules of the liquid crystal layer 74 are deflected by an electric field, and the deflected liquid crystal molecules refract the backlight provided by the backlight module 71 to the second substrate 73. A color film is provided on the second substrate 73, so that the backlight can present a different color after passing through the second substrate 73, and exit after undergoing the polarization of the second polarizer 77 to realize screen display of the light-emitting substrate 70. The color film is not limited to be provided on the second substrate 73, for example, when the first substrate 72 is a COA substrate, the color film is provided on the first substrate 72.

Referring in conjunction with FIGS. 5 and 6, the second touch control layer 80 is disposed on one side of the second polarizer 77 away from the second substrate 73. The second touch control electrode 81 of the second touch control layer 80 also includes a second drive electrode 81T and a second sense electrode 81R, both of which are located in the second display area AA2. The second drive electrodes 81T extend in the first direction X and are arranged at intervals in the second direction Y. The second sense electrodes 81R extend in the second direction Y and are arranged at intervals in the first direction X.

The touch traces 82 of the touch control layer are located in the first non-display area NA1 and extend from the first non-display area NA1 to the second non-display area NA2. Each of the touch traces 82 is electrically connected to one of the second drive electrodes 81T. The second drive electrode 81T is electrically connected to a second touch control drive device through the touch trace 82. The second touch control drive device is provided on the chip-on-film 3. Of course, the second sense electrode 81R is also electrically connected to the second touch control drive device through a corresponding touch trace 82. The touch trace 82 corresponding to the second sensing electrode 81R may be directly disposed in the second non-display area NA2.

As such, the touch trace 82 of the second touch control layer 80 is provided on one side of the second touch control electrode 81 away from the first display substrate 1. That is, the touch trace 82 of the second touch control layer 80 is not provided on the side of the second display substrate 2 adjacent to the first display substrate 1, so that no touch control border exists in the splice region of the second display substrate 2, thereby further improving the display quality of the display panel 100.

Figure 7:
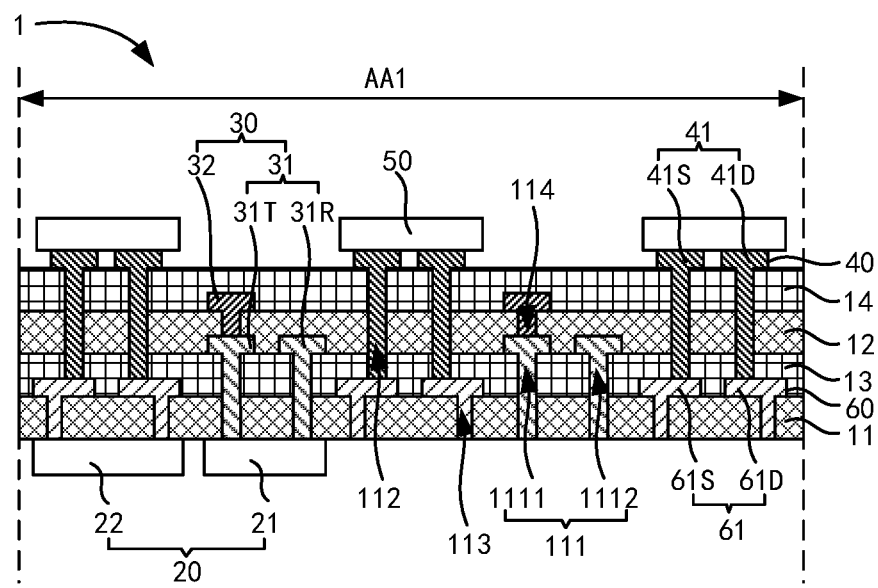
FIG. 7 is a schematic cross-sectional view of another structure of the first display substrate of FIG. 1.

In one embodiment, reference is made to FIGS. 1 to 7, where FIG. 7 is a schematic cross-sectional view of another structure of the first display substrate 1 of FIG. 1. In contrast to the above-described embodiments, referring to FIG. 7, the first touch control electrode 31 includes a first drive electrode 31T and a first sense electrode 31R. The first drive electrode 31T and the first sense electrode 31R are provided at a same layer. The first touch control layer 30 further includes bridge electrodes 32. The first drive electrode 31T or the first sense electrode 31R is bridged by the bridge electrode 32. The bridge electrode 32 is located on one side of the first drive electrode 31T and the first sense electrode 31R away from the drive device layer 20. The present embodiment takes the electrical connection between the first drive electrode 31T and the bridge electrode 32 as an example. The bridge electrode 32 is electrically connected to the first drive electrode 31T through the fourth via hole 114.

As such, when the first drive electrode 31T and the first sense electrode 31R are provided at a same layer, the bridge electrode 32 is provided on one side of the first drive electrode 31T and the first sense electrode 31R away from the drive device layer 20, so that the influence of the bridge electrode 32 on the provision of the first sub-hole 1111 and the second sub-hole 1112 can be reduced. For other description, refer to the above-mentioned embodiments, and details are not repeated herein.

Figure 8:
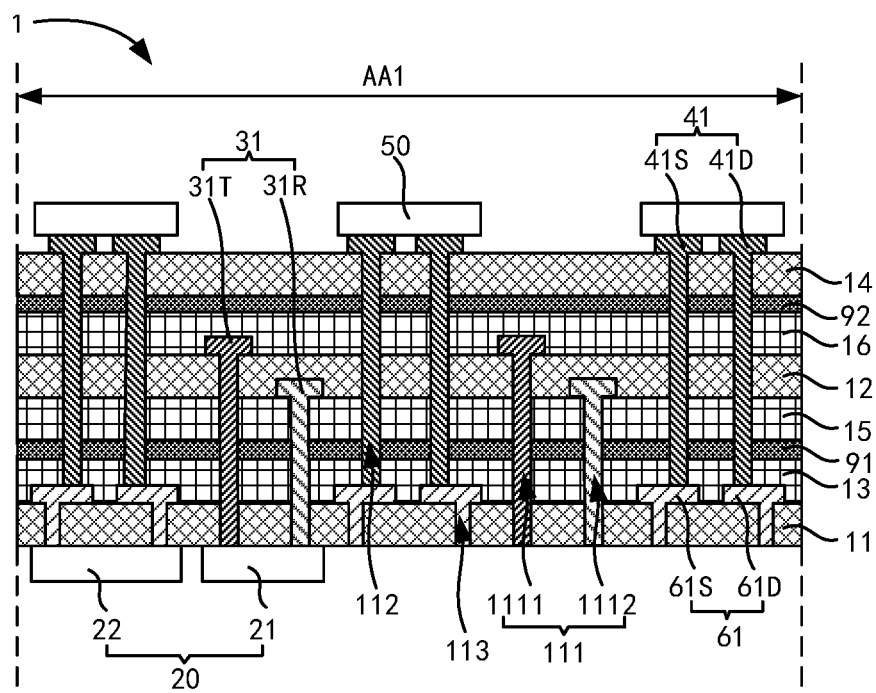
FIG. 8 is a schematic cross-sectional view of yet another structure of the first display substrate of FIG. 1.

In one embodiment, reference is made to FIGS. 1 to 8, which FIG. 8 is a schematic cross-sectional view of yet another structure of the first display substrate 1 of FIG. 1. In contrast to the above embodiments, referring to FIG. 8, the first display substrate 1 further includes a first shielding layer 91, a second shielding layer 92, a fifth insulating layer 15, and a sixth insulating layer 16. The first shielding layer 91 is disposed on one side of the third insulating layer 13 away from the signal line layer 60. The fifth insulating layer 15 is disposed between the first shielding layer 91 and the first touch control layer 30. The second shielding layer 92 is disposed on one side of the fourth insulating layer 14 away from the first touch control layer 30. The sixth insulating layer 16 is disposed between the second shielding layer 92 and the light-emitting device binding layer 40. Each of the first shielding layer 91 and the second shielding layer 92 has a constant potential thereon.

Alternatively, the first shielding layer 91, the second shielding layer 92 are of the same material as the signal line layer 60 and the first touch control electrode 31. The fifth insulating layer 15 and the sixth insulating layer 16 are of the same material as the first insulating layer 11.

In the present embodiment, by providing the first shielding layer 91 between the signal line layer 60 and the first touch control layer 30. A constant potential is provided on the first shielding layer 91, for example, the first shielding layer 91 is grounded, so that interference of the signal trace 61 of the signal line layer 60 to the first touch control layer 30 can be shielded. Similarly, the second shielding layer 92 is provided between the first touch control layer 30 and the light-emitting device binding layer 40. A constant potential is provided on the second shielding layer 92, for example, the second shielding layer 92 is grounded, so that interference of the light-emitting device binding layer 40 to the first touch control layer 30 can be shielded. For other description, refer to the above-mentioned embodiments, and details are not repeated herein.

Based on the same inventive concept, embodiments of the present disclosure further provide an electronic device including a display panel 100 of one of the foregoing embodiments.

The followings may be seen from the above embodiments. In the display panel and the electronic device provided by the present disclosure, the display panel includes at least one first display substrate. The first display substrate includes a drive device layer, a first insulating layer, a first touch control layer, a light-emitting device binding layer, and a light-emitting device that are provided in a stacked arrangement. The first touch control layer is provided with a first touch control electrode. The first touch control electrode is electrically connected to a first touch control drive device through a first via hole penetrating the first insulating layer. As such, the touch control layer is integrated in the first display substrate, and the touch control electrode of the touch control layer is directly electrically connected to the first touch control drive device by perforating the first display substrate, so that there is no touch control border in the touch control layer, thereby addressing the problem that the touch control border exists when an external-mounted capacitive touch control solution is adopted for the conventional large-screen displays.

In the above-mentioned embodiments, the description of each embodiment has its own emphasis, and parts not described in detail in a certain embodiment may be referred to the related description of other embodiments.

The embodiments of the present application have been introduced in detail above. Specific examples are used in the present disclosure to illustrate the principles and implementation methods of the present application. The description of the above embodiments is only used to help understand the technical solutions and core ideas of the present application. Those of ordinary skill in the art shall understand that they can still modify the technical solutions recited in the foregoing embodiments, or make equivalent substitutions for some of the technical features; and these modifications or substitutions do not cause the essence of the corresponding technical solutions to depart from the scope of the technical solutions of the embodiments of the present application.

What is claimed is:

1. A display panel comprising at least one first display substrate, the first display substrate comprising:
a first insulating layer;
a drive device layer disposed on a side of the first insulating layer, the drive device layer comprising a first touch control drive device and a first light-emitting drive device;
a first touch control layer disposed on a side of the first insulating layer away from the drive device layer, the first touch control layer being provided with a number of first touch control electrodes electrically connected to a first touch control drive device;
a light-emitting device binding layer disposed on a side of the first touch control layer away from the drive device layer, the light-emitting device binding layer being provided with a number of binding electrodes electrically connected to the first light-emitting drive device; and
a light-emitting device disposed on a side of the light-emitting device binding layer away from the first touch control layer and bonded to the binding electrode;
wherein the first display substrate further comprises a plurality of first via holes, each of the first via holes penetrating the first insulating layer, the first touch control electrode comprising an electrode portion and a connection portion, the electrode portion being located on the side of the first insulating layer away from the drive device layer, the connection portion being located in the first via hole, the electrode portion being electrically connected to the first touch control drive device through the connection portion,
wherein the first display substrate further comprises:
a signal line layer disposed on a side of the first insulating layer adjacent to the first touch control layer, the signal line layer comprising a number of signal traces electrically connected between the first light-emitting drive device and the binding electrode;
a third insulating layer disposed between the signal line layer and the first touch control layer; and
a fourth insulating layer disposed between the first touch control layer and the light-emitting device binding layer;
wherein the first display substrate further comprises a plurality of second via holes and a plurality of third via holes, the second via hole penetrating the fourth insulating layer, the first touch control layer, and the third insulating layer, the third via hole penetrating the first insulating layer, the binding electrode being electrically connected to the signal trace through the second via hole, and the signal trace being electrically connected to the first light-emitting drive device through the third via hole,
wherein the first touch control electrode comprises a first drive electrode and a first sense electrode, the first drive electrode and the first sense electrode being arranged at a same layer, the first drive electrode and the first sense electrode of the first touch control layer are intersected in an insulation manner to form a grid, the second via hole passes through the grid formed by the first drive electrode and the first sense electrode.

2. The display panel of claim 1, wherein the first touch control electrode comprises a first drive electrode and a first sense electrode, the first drive electrode and the first sense electrode being arranged at a same layer, the first touch control layer further comprises a number of bridge electrodes, the first drive electrode being bridged through the bridge electrode, the bridge electrode being located on a side of the first drive electrode and the first sense electrode away from the drive device layer.

3. The display panel of claim 1, wherein the first touch control electrode comprises a first drive electrode and a first sense electrode, the first drive electrode and the first sense electrode being arranged at a same layer, the first touch control layer further comprises a number of bridge electrodes, the first sense electrode being bridged through the bridge electrode, the bridge electrode being located on a side of the first drive electrode and the first sense electrode away from the drive device layer.

4. The display panel of claim 1, wherein the first touch control electrode comprises a first drive electrode and a first sense electrode, the first drive electrode comprising a drive electrode portion and a drive connection portion, and the first sense electrode comprising a sense electrode portion and a sense connection portion;

the first display substrate further comprises a second insulating layer on the side of the first insulating layer away from the drive device layer, the drive electrode portion being located on a side of the second insulating layer away from the first insulating layer, and the sense electrode portion being located on a side of the second insulating layer adjacent to the first insulating layer;

the first via hole comprises a first sub-hole and a second sub-hole, the first sub-hole penetrating the second insulating layer and the first insulating layer, the second sub-hole penetrating the first insulating layer, the drive connection portion being located in the first sub-hole, the drive electrode portion being electrically connected to the first touch control drive device through the drive connection portion; the sense connection portion is located in the second sub-hole, and the sense electrode portion is electrically connected to the first touch control drive device through the sense connection portion.

5. The display panel of claim 4, wherein a line width of the first drive electrode and a line width of the first sense electrode are in a range of 30 μm to 100 μm, a line spacing between adjacent ones of the first drive electrodes is greater than or equal to 50 μm, and a line spacing between adjacent ones of the first sense electrodes is greater than or equal to 50 μm.

6. The display panel of claim 1, wherein the first display substrate further comprises:
  a first shielding layer disposed on a side of the third insulating layer away from the signal line layer;
  a fifth insulating layer disposed between the first shielding layer and the first touch control layer;
  a second shielding layer disposed on a side of the fourth insulating layer away from the first touch control layer;
  a sixth insulating layer disposed between the second shielding layer and the light-emitting device binding layer;
  wherein the first shielding layer and the second shielding layer each have a constant potential thereon.

7. The display panel of claim 6, wherein the first shielding layer, the second shielding layer, the signal line layer and the first touch control electrode are of a same material.

8. The display panel of claim 1, further comprising a plurality of second display substrates, the plurality of second display substrates being spliced to each other, the first display substrate being located at splices of two adjacent ones of the second display substrates.

9. The display panel of claim 8, wherein the second display substrate comprises a light-emitting substrate and a second touch control layer on a light-emitting side of the light-emitting substrate, the second touch control layer being provided with second touch control electrodes and touch traces on a side of the second touch control electrodes away from the first display substrate, each of the touch traces being electrically connected to one of the second touch control electrodes.

10. An electronic device comprising a display panel, wherein the display panel comprises at least one first display substrate, the first display substrate comprising:
  a first insulating layer;
  a drive device layer disposed on a side of the first insulating layer, the drive device layer comprising a first touch control drive device and a first light-emitting drive device;
  a first touch control layer disposed on a side of the first insulating layer away from the drive device layer, the first touch control layer being provided with a number of first touch control electrodes electrically connected to a first touch control drive device;
  a light-emitting device binding layer disposed on a side of the first touch control layer away from the drive device layer, the light-emitting device binding layer being provided with a number of binding electrodes electrically connected to the first light-emitting drive device; and
  a light-emitting device disposed on a side of the light-emitting device binding layer away from the first touch control layer and bonded to the binding electrode;
  wherein the first display substrate further comprises a plurality of first via holes, each of the first via holes penetrating the first insulating layer, the first touch control electrode comprising an electrode portion and a connection portion, the electrode portion being located on the side of the first insulating layer away from the drive device layer, the connection portion being located in the first via hole, the electrode portion being electrically connected to the first touch control drive device through the connection portion,
  wherein the first display substrate further comprises:
  a signal line layer disposed on a side of the first insulating layer adjacent to the first touch control layer, the signal line layer comprising a number of signal traces electrically connected between the first light-emitting drive device and the binding electrode;
  a third insulating layer disposed between the signal line layer and the first touch control layer; and
  a fourth insulating layer disposed between the first touch control layer and the light-emitting device binding layer;
  wherein the first display substrate further comprises a plurality of second via holes and a plurality of third via holes, the second via hole penetrating the fourth insulating layer, the first touch control layer, and the third insulating layer, the third via hole penetrating the first insulating layer, the binding electrode being electrically connected to the signal trace through the second via hole, and the signal trace being electrically connected to the first light-emitting drive device through the third via hole,
  wherein the first touch control electrode comprises a first drive electrode and a first sense electrode, the first drive electrode and the first sense electrode being arranged at a same layer, the first drive electrode and the first sense electrode of the first touch control layer are intersected in an insulation manner to form a grid, the second via hole passes through the grid formed by the first drive electrode and the first sense electrode.

11. The electronic device of claim 10, wherein the first touch control electrode comprises a first drive electrode and a first sense electrode, the first drive electrode and the first sense electrode being arranged at a same layer, the first touch control layer further comprises a number of bridge electrodes, the first drive electrode being bridged through the bridge electrode, the bridge electrode being located on a side of the first drive electrode and the first sense electrode away from the drive device layer.

12. The electronic device of claim 10, wherein the first touch control electrode comprises a first drive electrode and a first sense electrode, the first drive electrode and the first sense electrode being arranged at a same layer, the first touch control layer further comprises a number of bridge electrodes, the first sense electrode being bridged through the bridge electrode, the bridge electrode being located on a side of the first drive electrode and the first sense electrode away from the drive device layer.

13. The electronic device of claim 10, wherein the first touch control electrode comprises a first drive electrode and a first sense electrode, the first drive electrode comprising a drive electrode portion and a drive connection portion, and the first sense electrode comprising a sense electrode portion and a sense connection portion;

the first display substrate further comprises a second insulating layer on the side of the first insulating layer away from the drive device layer, the drive electrode portion being located on a side of the second insulating layer away from the first insulating layer, and the sense electrode portion being located on a side of the second insulating layer adjacent to the first insulating layer;

the first via hole comprises a first sub-hole and a second sub-hole, the first sub-hole penetrating the second insulating layer and the first insulating layer, the second sub-hole penetrating the first insulating layer, the drive connection portion being located in the first sub-hole, the drive electrode portion being electrically connected to the first touch control drive device through the drive connection portion; the sense connection portion is located in the second sub-hole, and the sense electrode portion is electrically connected to the first touch control drive device through the sense connection portion.

14. The electronic device of claim 13, wherein a line width of the first drive electrode and a line width of the first sense electrode are in a range of 30 μm to 100 μm, a line spacing between adjacent ones of the first drive electrodes is greater than or equal to 50 μm, and a line spacing between adjacent ones of the first sense electrodes is greater than or equal to 50 μm.

15. The electronic device of claim 10, wherein the first display substrate further comprises:

a first shielding layer disposed on a side of the third insulating layer away from the signal line layer;

a fifth insulating layer disposed between the first shielding layer and the first touch control layer;

a second shielding layer disposed on a side of the fourth insulating layer away from the first touch control layer;

a sixth insulating layer disposed between the second shielding layer and the light-emitting device binding layer;

wherein the first shielding layer and the second shielding layer each have a constant potential thereon.

16. The electronic device of claim 15, wherein the first shielding layer, the second shielding layer, the signal line layer and the first touch control electrode are of a same material.

17. The electronic device of claim 10, wherein the display panel further comprises a plurality of second display substrates, the plurality of second display substrates being spliced to each other, the first display substrate being located at splices of two adjacent ones of the second display substrates.

18. The electronic device of claim 17, wherein the second display substrate comprises a light-emitting substrate and a second touch control layer on a light-emitting side of the light-emitting substrate, the second touch control layer being provided with second touch control electrodes and touch traces on a side of the second touch control electrodes away from the first display substrate, each of the touch traces being electrically connected to one of the second touch control electrodes.

* * * * *